A. HUBERTY.
LAWN TRIMMER.
APPLICATION FILED SEPT. 27, 1915.
1,163,238.
Patented Dec. 7, 1915.
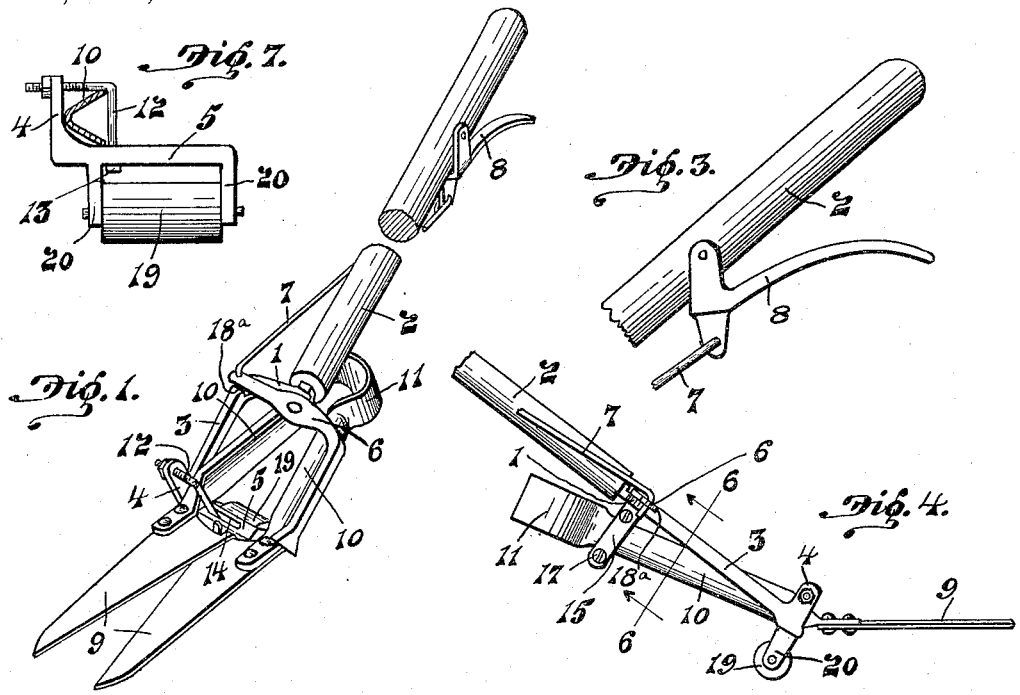
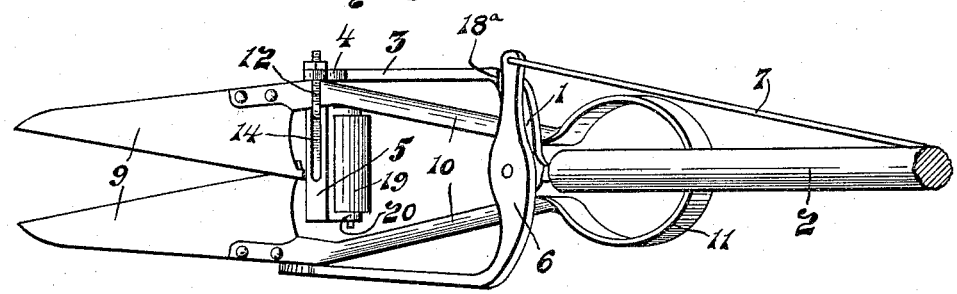
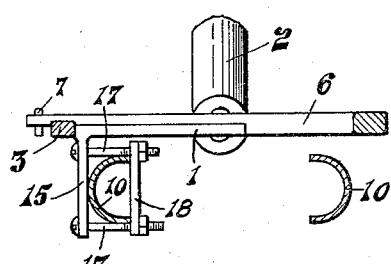
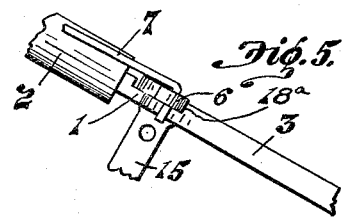
Witness
Robert A. Karcher
Inventor
August Huberty
By F. W. Bond
Attorney

UNITED STATES PATENT OFFICE.

AUGUST HUBERTY, OF CANTON, OHIO.

LAWN-TRIMMER.

1,163,238.  Specification of Letters Patent.  Patented Dec. 7, 1915.

Application filed September 27, 1915. Serial No. 52,811.

*To all whom it may concern:*

Be it known that I, AUGUST HUBERTY, a citizen of the United States, residing at Canton, in the county of Stark and State of Ohio, have invented a new and useful Lawn-Trimmer, of which the following is a specification.

My invention relates to improvements in lawn trimmers, more especially designed for trimming grass and weeds adjacent to curbings, walls, plants, trees or shrubbery or other places where an ordinary lawn mower cannot be used for the purpose of trimming.

The objects of the present invention, are, first, to provide a device wherein ordinary sheep shears can be utilized; second, to provide a head or frame to which the shears are attached; and third, to so attach the shears that they can be easily operated. These objects, together with other objects readily apparent to those skilled in the art, may be attained by the construction illustrated in the accompanying drawings, although the invention may be embodied in other forms, the construction illustrated being chosen by way of example.

In the accompanying drawing: Figure 1 is a perspective view. Fig. 2 is a top view. Fig. 3 is a view showing a portion of the handle, the operating lever and a portion of the link. Fig. 4 is a side elevation. Fig. 5 is a view showing a portion of the frame and handle. Fig. 6 is a section on line 6—6, Fig. 4. Fig. 7 is a view showing the roll carrier and roll, and the relative position of the L-shaped clamping bolt.

Similar numerals of reference indicate corresponding parts in all the figures of the drawing.

In the accompanying drawing, 1 represents the head or frame, to which the handle 2 is attached in any convenient and well known manner. The head 1 is provided with the forward extending arm 3, which arm is provided with the upwardly extending post 4 and the slotted bar and roll carrier 5.

To the head 1 is pivotally attached the L-shaped lever 6, to which L-shaped lever is connected the actuating rod 7, which rod extends along the handle and is connected to the hand lever 8, which hand lever is pivotally attached to the handle, said lever being for the purpose of imparting a reciprocating movement to the rod 7 and a rocking movement to the L-shaped lever 6. The shear blades 9 are formed in the usual manner to which the ordinary shanks 10 are attached, said shanks being connected together by the ordinary spring loop 11. So far as the construction of the shears are concerned they do not have to do with the present invention, except in the manner of actuating the lever and connecting the same to be actuated by the hand lever 8 and the parts connected to said hand lever.

It is well understood that in a device of the character described, it is of importance that the head that carries the shears should be so constructed that the shears can be properly attached and actuated, regardless of their detailed construction. It is also desirable that different size shears can be attached without materially changing the head, and also the devices that actuate the shears. In order to provide for connecting the shears of different styles, but of the same general nature I provide the forward extending arm 3 with the post 4, through which post is located the L-shaped bolt 12, which L-shaped bolt is also connected to the slotted bar 5. The head 13 upon the L-shaped bolt 12 is so formed that it can be passed through the slot 14 when said head is turned lengthwise with reference to said slot, but cannot pass through said slot when turned cross-wise or when the L-shaped bolt is brought into its normal position to clamp and hold the shear shank. It is well understood that the shanks of the shears may vary as to size and in order to provide for properly clamping various sized shanks the elongated slot 14 is provided so that the L-shaped bolt can be adjusted to properly clamp various sized shanks. The head 1 is provided with the downwardly extending arm 15, which downwardly extending arm is for the purpose of clamping the spring end of one of the shear blade shanks or handles by means of the clamping bolts 17 and the clamping plate 18. It will be understood that by providing two attaching points for the fixed shank of the blade, that one of the shanks and its blade will be held against relative movement as between said shank and the head or frame to which it is attached.

The L-shaped lever is so formed that its forward end will come in contact with the shear-shank located adjacent said L-shaped lever. It will be understood that when a rocking movement is imparted to the L- shaped lever by means of the hand lever 8 and its intermediate parts, a shearing movement will be imparted to one of the shearing blades 9, the action being as follows: When the L-shaped lever 6 is rocked in the direction to move its forward extending arm inward it will also move the shear blade 9, the shank of which is in contact with the L-shaped lever and when the hand lever 8 is released the spring loop 11 will automatically move the shear and its shank, together with the L-shaped lever, thereby bringing the shear blades into position for further action by means of the hand lever 8.

It is well understood that provision should be made to prevent the heels of the shear blades 9 from separating during their action or movement relative to each other and in order to limit the movement of the L-shaped lever 6 I provide the shoulder 18$^a$ and so locate said shoulder that the L-shaped lever 6 will come in contact with said shoulder when it is moved by the spring loop 11, by which arrangement the outward movement of the relatively movable blade will be limited, and so limited that the heels of the blade will not become separated.

For the purpose of providing means for moving the device upon the surface over and upon which the device is moved, I provide the carrier roller 19, which carrier roller is properly journaled in suitable ears 20 located upon the under side of the slotted bar 5.

Having fully described my invention what I claim as new and desire to secure by Letters Patent, is—

1. In a lawn trimmer, the combination with shears, of a head provided with an operating handle, said head also provided with a forwardly extending arm, said arm provided with an upwardly extending post and a slotted roll carrying bar secured to said arm, a bolt connected to said slotted bar and to the upwardly extending post, an L-shaped lever pivotally connected to said head and located at the forward end of the operating handle, said L-shaped lever adapted for sliding contact with the shears, and means for actuating said lever.

2. In a lawn trimmer, the combination with shears, of a head provided with an operating handle, said head provided with a forwardly extending arm, an upwardly extending post located at the forward end of said arm and a slotted roll carrying bar, a bolt connected to said slotted roll carrying bar and said upwardly extending post, an L-shaped lever pivotally connected to said head, said L-shaped lever located at one side of the shears and adapted for sliding contact with said shears, a shoulder located at the rear end portion of the forwardly extending arm, said shoulder adapted to limit the movement in one direction of said L-shaped lever, and means for actuating said L-shaped lever.

3. In a lawn trimmer, the combination with shears, of a head, said head provided with an actuating handle, a forwardly extending arm, an upwardly extending post located at the forward end of said arm and a downwardly extending arm located upon said head at the rear portion thereof, a slotted bar carried by said forwardly extending arm, a bolt adjustably connected to said slotted bar and to the upwardly extending post, a roll carried by said slotted bar, an L-shaped lever pivotally connected to said head, and a forwardly extending portion of said lever adapted for sliding contact with the shears.

4. In a lawn trimmer, the combination with shears, of a head provided with an operating handle, and means for attaching one of the shear shanks to said head, an L-shaped lever pivotally connected to said head, said L-shaped lever consisting of a forwardly extending arm, said arm adapted for sliding contact with one of the shears and adapted to move one of the shear blades in one direction, and means for actuating said L-shaped lever.

In testimony that I claim the above, I have hereunto subscribed my name.

AUGUST HUBERTY.

Copies of this patent may be obtained for five cents each, by addressing the "Commissioner of Patents, Washington, D. C."